US006609976B1

United States Patent
Yamagishi et al.

(10) Patent No.: US 6,609,976 B1
(45) Date of Patent: Aug. 26, 2003

(54) METHOD OF EXECUTING PROCESSING FOR DISPLAYING HINTS TO A CHARACTER, PROGRAM PRODUCT AND GAME SYSTEM FOR THE SAME

(75) Inventors: Nozomu Yamagishi, Tokyo (JP); Shinichiro Okaniwa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 09/559,125

(22) Filed: Apr. 28, 2000

(51) Int. Cl.⁷ .................................................. A63F 13/10

(52) U.S. Cl. .......................... 463/31; 463/30; 463/23; 463/1

(58) Field of Search .............................. 463/30, 31, 23, 463/1

(56) References Cited

U.S. PATENT DOCUMENTS 5,377,997 A  * 1/1995  Wilden et al. ................. 463/1
5,682,469 A  * 10/1997 Linnett et al. ............... 395/173
6,296,570 B1 * 10/2001 Miyamoto et al. ............ 463/30

* cited by examiner

*Primary Examiner*—Jessica Harrison
(74) *Attorney, Agent, or Firm*—Greenblum & Bernstein, P.L.C.

(57) ABSTRACT

A method of executing processing for displaying hints to a character in a role playing game, and a program product and game system for the same, judge if a character being operated in response to an operational input from a player is at a location for which a special action is set. The invention also judges if the character has the ability to execute the special action set for that location, and, when that character has the ability to execute the special action, displays the navigation on the screen. When the character does not have the ability to execute the special action, a hint is displayed on the screen.

18 Claims, 14 Drawing Sheets

Fig.3

| CHARACTER | ABILITY |
|---|---|
| CHARACTER A | HIGH JUMP |
| CHARACTER B | MAGIC |
| ⋮ | ⋮ |

Fig.4

| TRICK OBJECT | TRICK |
|---|---|
| WOOD BOX A | JUMP ON |
| WOOD BOX B | DESTROY BY MAGIC |
| CHIN BAR A | JUMP TO |
| ⋮ | ⋮ |

Fig.5

| TRICK | CONDITION |
|---|---|
| JUMP ON | MUST BE CHARACTER ABLE TO JUMP HIGH |
| DESTROY BY MAGIC | MUST BE CHARACTER ABLE TO USE MAGIC |
| JUMP TO | MUST BE CHARACTER ABLE TO JUMP HIGH |
| ⋮ | ⋮ |

Fig.6

| TRICK | MESSAGE | |
| | GUIDANCE MESSAGE | HINT MESSAGE |
|---|---|---|
| JUMP ON | "JUMP ON" | "IMPOSSIBLE UNLESS SOMEONE CAN JUMP..." |
| DESTROY BY MAGIC | "DESTROY" | "IF SOMEONE COULD USE MAGIC..." |
| JUMP TO | "JUMP TO" | "IMPOSSIBLE UNLESS SOMEONE CAN JUMP..." |
| ⋮ | ⋮ | ⋮ |

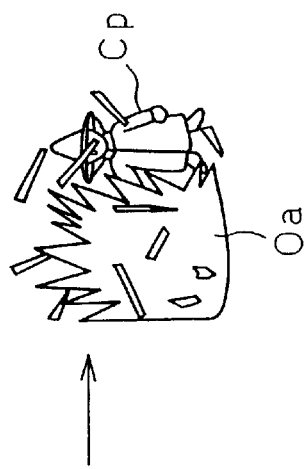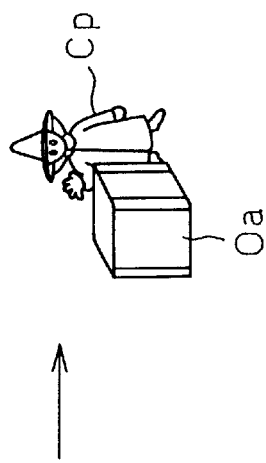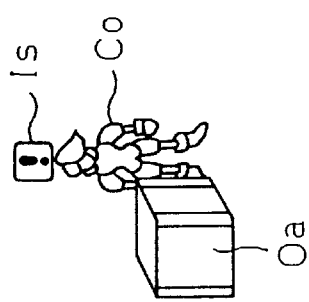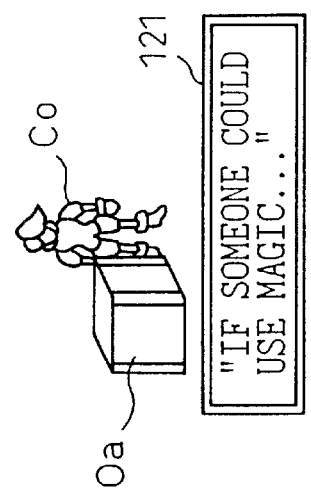

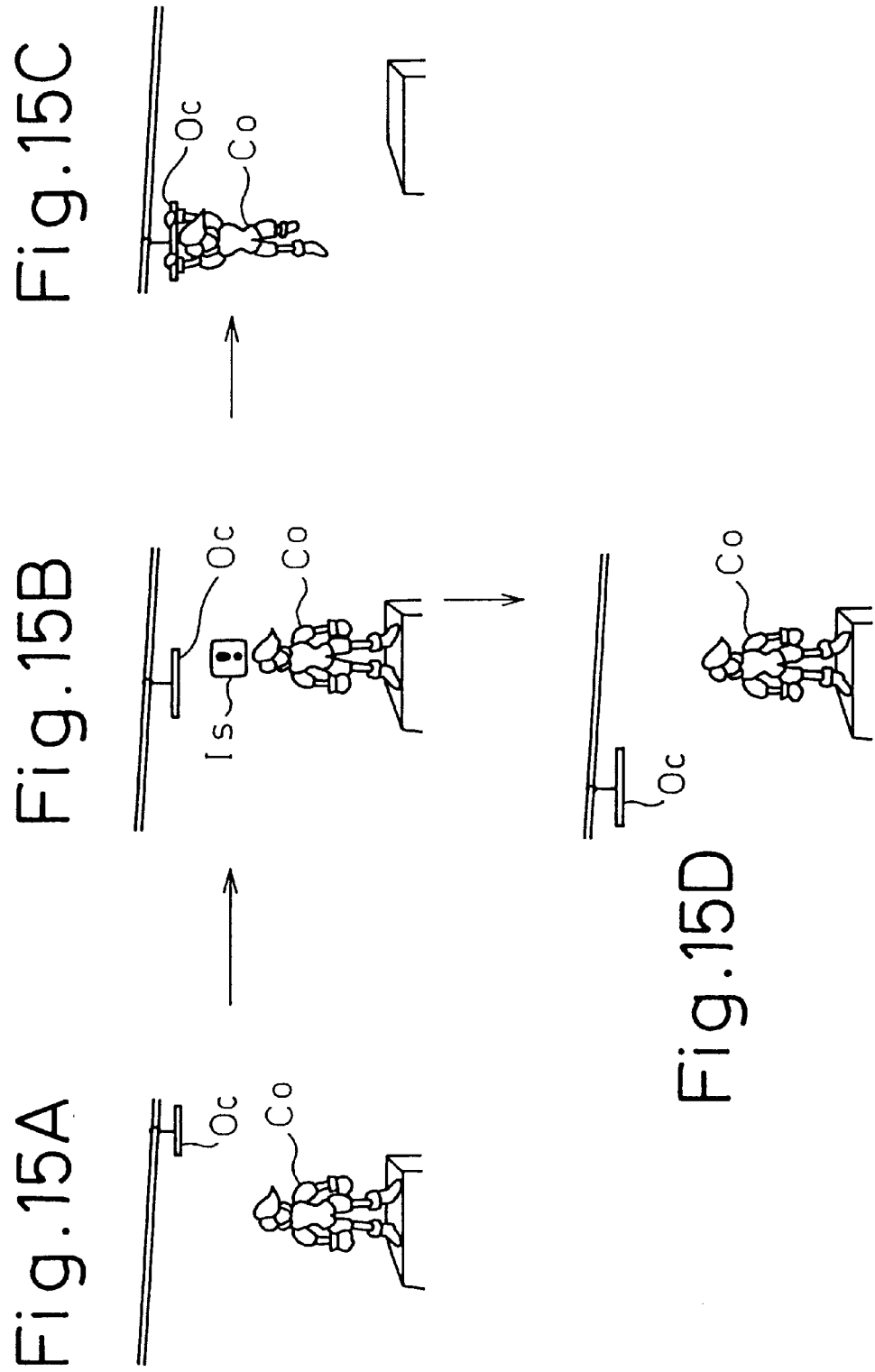

1) JUMP ON
?) IF SOMEONE COULD USE MAGIC...

1) JUMP ON
2) DESTROY

1) JUMP ON
2) DESTROY

METHOD OF EXECUTING PROCESSING FOR DISPLAYING HINTS TO A CHARACTER, PROGRAM PRODUCT AND GAME SYSTEM FOR THE SAME

BACKGROUND OF THE INVENTION

1. Field of the Invention

The present invention relates to a method of executing processing for displaying hints to a character and a program product and game system for the same. More particularly, the present invention relates to a game control method of a video game and a computer readable program product storing a program and a video game system for the same. Still more particularly, the present invention relates to a game control method of a video game having characters able to be operated by a player and enabling those characters to engage in various types of actions by operation by the player, such as a role playing game (RPG), and a computer readable program product storing a program and video game system for the same.

2. Description of the Related Art

There are many types of video games played by video game systems. As one of these, there is the type of video game called a role playing game. In a role playing game, along with progress in the game, various types of events such as fights, encounters, and conversations with enemy characters and discoveries of the same occur in accordance with actions performed by the player character operated by the player in the virtual space during the game. Note that an "enemy character" is a character controlled by the computer in accordance with an action control algorithm in the game.

In a video game of this type, in addition to fights with enemy characters etc., there are special actions which can be executed in the process of progress of the game only when the player character is near a specific location in the game virtual space, for example, a location with a wood box (hereinafter referred to as "special actions"). A special action is an action other than walking or another ordinary action. For example, it is an action of the player character jumping onto a wood box by jumping high by depression by the player of an assigned action button on the input device of the video game system, that is, the keypad.

As explained above, at the specific location, the player character engages in a special action such as jumping onto a wood box by jumping high by an operation of the player. Displaying this on the screen enables the interest of the game to be improved. Further, it is possible to have a new event generated by the player character jumping onto the wood box and thereby give greater diversity to the game.

Even when the player character is able to engage in a special action at a specific location, however, the player sometimes will not notice this and therefore the special action will not be performed. If the player does not notice the various tricks and events provided during the game, the player will not be able to sufficiently experience the various events set in the game.

SUMMARY OF THE INVENTION

An object of the present invention is to provide a game control method of a video game, and a computer readable program product storing a program and a video game system for the same, enabling even a player not familiar with the game to easily execute special actions.

To achieve the above object, according to a first aspect of the present invention, there is provided a method of executing a game program displaying a hint on a screen about a character provided with an ability for action, comprising setting an event point in advance in a range of action of a character, which is the virtual space in which the character can move. The method also includes providing corresponding navigation information and hint information for each event point, judging if a character in a party including a plurality of characters has reached a set event point, and, when judging that the character has reached the set event point, judging if a character belonging to the party has the ability for action and selecting navigation information or hint information linked with that set event point in accordance with the judged ability for action and, when the corresponding navigation information has been selected, performing navigation based on the navigation information on the screen, while when the corresponding hint information has been selected, providing a hint based on the hint information on the screen.

According to a second aspect of the present invention, there is provided a computer readable program product storing a game program displaying a hint on a screen about a character provided with an ability for action, the program setting an event point in advance in an area of action of a character, providing corresponding navigation information and hint information for each event point, and making the computer judge if a character in a party including a plurality of characters has reached a set event point, and, when judging that the character has reached the set event point, judge if a character belonging to the party has the ability for action and selecting navigation information or hint information linked with that set event point in accordance with the judged ability for action and, when the corresponding navigation information has been selected, perform navigation based on the navigation information on the screen, while when the corresponding hint information has been selected, provide a hint based on the hint information on the screen.

According to a third aspect of the present invention, there is provided a game system provided with a unit for execution of a game in accordance with a game program displaying a hint on a screen about a character provided with an ability for action, a memory for storing all or part of the program, and a display screen for displaying the game being executed by the unit. The unit in accordance with a program stored in the memory, sets an event point in advance in an area of action of a character, provides corresponding navigation information and hint information for each event point, and judges if a character in a party including a plurality of characters has reached a set event point. When judging that the character has reached the set event point, the unit judges if a character belonging to the party has the ability for action and selects navigation information or hint information linked with that set event point in accordance with the judged ability for action. When the corresponding navigation information has been selected, the unit performs navigation based on the navigation information on the screen, while when the corresponding hint information has been selected, the unit provides a hint based on the hint information on the screen.

BRIEF DESCRIPTION OF THE DRAWINGS

These and other objects and features of the present invention will become clearer from the following description of the preferred embodiments given with reference to the attached drawings, in which:

FIG. 3 is a view explaining an example of the data configuration of a character ability management table used in a game by a game control method according to an embodiment of the present invention;

FIG. 4 is a view explaining an example of the data configuration of a trick object management table used in a game by a game control method according to an embodiment of the present invention;

FIG. 5 is a view explaining an example of the data configuration of a trick execution condition management table used in a game by a game control method according to an embodiment of the present invention;

FIG. 6 is a view explaining an example of the data configuration of a message management table used in a game by a game control method according to an embodiment of the present invention;

FIG. 13A is a first view of an example of the change in state when a character being operated cannot execute a special action;

FIG. 13B is a second view of an example of the change in state when a character being operated cannot execute a special action;

FIG. 13C is a third view of an example of the change in state when a character being operated cannot execute a special action;

FIG. 13D is a fourth view of an example of the change in state when a character being operated cannot execute a special action;

FIG. 15A is a first view of an example of the change in state when an object set with a trick moves;

FIG. 15B is a second view of an example of the change in state when an object set with a trick moves;

FIG. 15C is a third view of an example of the change in state when an object set with a trick moves;

FIG. 15D is a fourth view of an example of the change in state when an object set with a trick moves;

DESCRIPTION OF THE PREFERRED EMBODIMENTS

Preferred embodiments of the present invention will be explained below with reference to the drawings.

Figure 1:
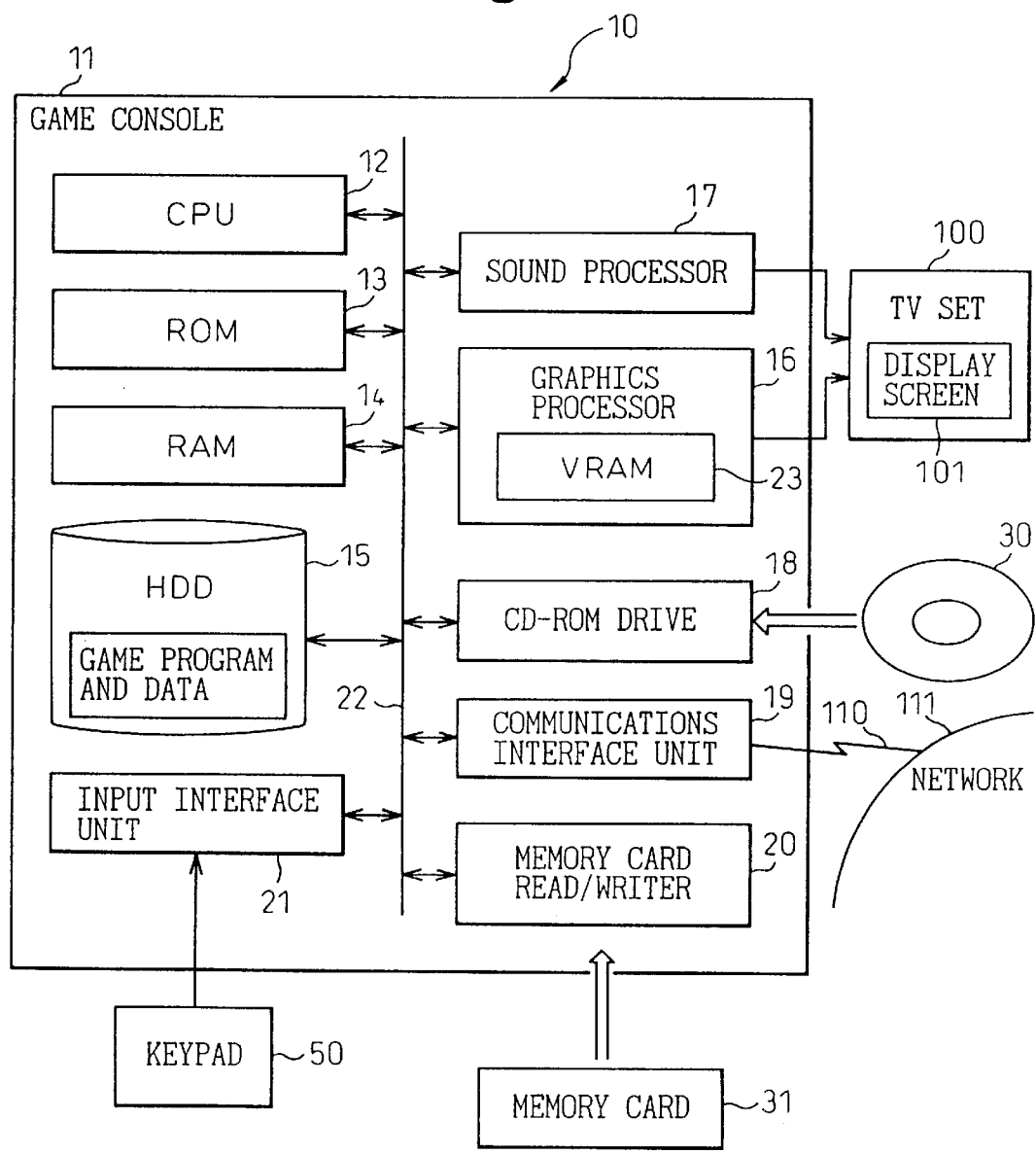
FIG. 1 is a block diagram of an example of the overall configuration of a video game system according to an embodiment of the present invention.

FIG. 1 shows an example of a video game system according to an embodiment of the present invention. The video game system 10 executes a program stored in a computer readable program product according to the present invention and is used for working a game control method according to the present invention.

The video game system 10 is, for example, comprised of a game console 11 and a keypad 50 connected to an input side of the game console 11. A television set 100 having a cathode ray tube (CRT) etc. is connected to an output side of the game console 11 as a monitor with speakers. The keypad 50 is operated by a user (player) for giving user operating instructions to the game console 11. The television set 100 displays a video (image) and outputs sounds in accordance with the content of the game based on a video signal (image signal) or sound signal from the game console 11.

The game console 11 is for example comprised of a central processor (CPU) 12, read only memory (ROM) 13, random access memory (RAM) 14, hard disk drive (HDD) 15, graphics processor 16, sound processor 17, compact disk ROM (CD-ROM) drive 18, communications interface unit 19, memory card read/writer 20, input interface unit 21, and bus 22 for connecting these.

The CPU 12 executes the operating system stored in the ROM 13 to control the game system as a whole. Further, the CPU 12 executes a game program stored in the later explained program storage area 14A of the RAM 14.

The RAM 14 stores various data such as the game program. For example, the RAM 14 stores the game program and image data read by the CD-ROM drive 18 from the CD-ROM 30 in its different areas. Further, the game program or image data may be stored in the hard disk drive 15. Note that the game program and image data may also be stored in the hard disk drive 15 and loaded from the hard disk drive 15 to the RAM 14.

The graphics processor 16 includes a video RAM (VRAM) 23 having a frame buffer, generates a video signal based on the image data stored in the frame buffer based on commands from the CPU 12 along with execution of the program, and outputs the video signal to the television set 100. Due to this, an image is displayed based on the image data stored in the frame buffer on the display screen 101 of the television set 100.

The sound processor 17 has the function of generating background music, sound effects, and other sound signals.

The sound processor 17 generates a sound signal based on data stored in the RAM 14 in accordance with a command from the CPU 12 along with execution of the program and outputs it to the television set 100.

The CD-ROM drive 18 is loaded with a program product, that is, a CD-ROM 30. The CD-ROM drive 18 reads the game program, image data, sound data, etc. stored in the CD-ROM 30.

The communications interface unit 19 is connected selectively to the network 111 by a communications line 110 for data communications with other devices.

The memory card read/writer 20 has inserted in it a memory card 31 which stores data on the interim progress of the game, data on the game environment settings, and other saved data.

The computer readable program product according to the present invention is a computer readable program product storing a game program. The computer readable program product is comprised of a CD-ROM 30 or hard disk 15. A computer may be made to perform the following processing by having the computer execute the game program recorded in the program product.

That is, the computer executing the game program executes processing relating to an action of the player character designated in accordance with an operational input by the keypad 50. Further, the computer has the player character execute a special action other than an ordinary action and has this played out on the display screen only when the player character is near a specific location in the game virtual space.

Further, the computer judges if the player character is at a location where it can engage in a special action in the game virtual space. When the player character is at a location where it can engage in a special action, the computer displays the fact that the special action can be taken on the screen to inform the player. Note that in the present embodiment, the program to be executed in the video game system 10 is stored in a program product.

In the present embodiment, the computer displays the fact that the player character or a party character can take a special action on the screen to inform the player. That is, the computer performs special action processing with navigation. Further, when the player character is at a location where a special action can be taken, but that special action is not possible with the ability of the player character and party character, the computer displays a hint.

Note that in the present embodiment, in addition to the player character, there are party characters accompanying the player character. The party characters are also able to take special actions.

Figure 2:
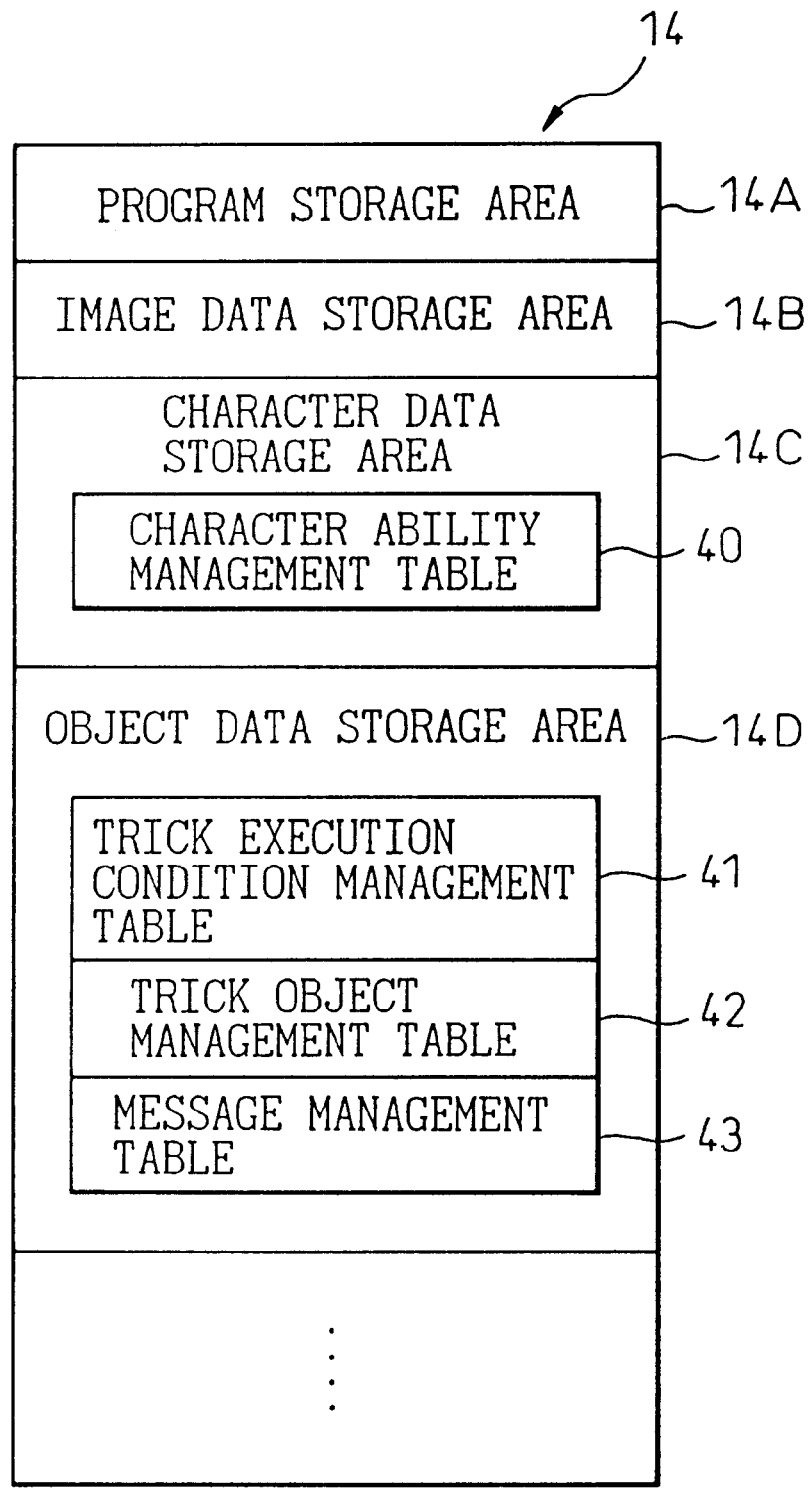
FIG. 2 is a view explaining an example of the memory configuration of a RAM of a video game system for a game by a game control method according to an embodiment of the present invention.

Next, the data stored in the RAM 14 at the time of execution of a game program will be explained. FIG. 2 shows an example of the memory configuration of the RAM 14. As shown in FIG. 2, the storage area of the RAM 14 is provided with a program storage area 14A for storing the game program, an image data storage area 14B for storing the background, characters, and other image data required in the process of execution of the game program, a character storage area 14C for storing data on the characters appearing in the game, an object data storage area 14D for storing data on objects such as a wood box displayed on the screen during the game, etc. Note that the image data storage area 14B also stores the image of a FEEL icon.

The character storage area 14C of the RAM 14 stores character ability management data 40. Further, the object data storage area 14D of the RAM 14 stores a trick execution condition management table 41, a trick object management table 42, and a message management table 43.

The character ability management table 40 defines the abilities of the characters. These abilities are the abilities required for execution of specific actions. FIG. 3 shows an example of the data configuration of the character ability management table 40. As shown in FIG. 3, the character ability management table 40 is for example structured with a column 401 storing the names of the characters (player character and party characters) and a column 402 storing abilities. The abilities of characters include for example a "HIGH JUMP" and "MAGIC". In the example of FIG. 3, the "CHARACTER A" is given the "HIGH JUMP" ability. The "CHARACTER B" is given the "MAGIC" ability.

The trick object management table 41 defines the content of a special action, that is, trick, set for each object for which there is a trick (hereinafter referred to as a "trick object"). Here, a "trick object" is an object affected by an event due to a special action. Execution of a special action for a trick object requires that the character being operated reach near the trick object. That is, the area near the trick object is the point of generation of an event for execution of a special action on the trick object. Note that a plurality of trick objects are arranged in the area of the character's action. The area means forest, town, etc., in the gaming world.

FIG. 4 shows an example of the data configuration of the trick object management table 41. The trick object management table 41 shown in FIG. 4 is structured with a column 411 storing trick objects such as a "WOOD BOX" and "CHIN BAR" and a column 412 storing the contents (types) of tricks such as "JUMP ON", "DESTROY BY MAGIC", and "JUMP TO". In the example of FIG. 4, "JUMP ON" is defined as the trick for the "WOOD BOX A", "DESTROY BY MAGIC" is defined as the trick for the "WOOD BOX B", and "JUMP TO" is defined as the trick for the "CHIN BAR A".

The trick execution condition management table 42 defines for each trick covered by a special action a condition for execution of the trick. If the condition for execution of a certain type of trick is satisfied, a special action can be executed on an object for which that type of trick is set. That is, it becomes possible to clear an event set for a predetermined location (execute a special action for the trick).

FIG. 5 shows an example of the data configuration of the trick execution condition management table 42. The trick execution condition management table 42, as shown in FIG. 5, is structured with a column 421 for storing types of tricks and a column 422 for storing the trick execution conditions. As trick execution conditions, there are for example the "HIGH JUMP" and "MAGIC" in the column 402 storing abilities in the character ability management table 40. Further, as trick execution conditions, in a role playing game, there are the degree of growth, equipment, etc. of a character.

For example, in FIG. 5, the condition for execution of a special action for a "JUMP ON" trick is that the character be able to jump high, the condition for execution of a special action for a "DESTROY BY MAGIC" trick is that the character be able to use magic, and the condition for execution of a special action for a "JUMP TO" trick is that the character be able to jump high.

The message management table 43 defines for each type of trick a guidance (navigation) message for display in a selection menu etc. or a hint message when a character moves to a location where a special action can be executed.

FIG. 6 shows an example of the data configuration of the message management table 43. The message management table 43, as shown in FIG. 6, has a column 431 for storing types of tricks, a column 432 for storing guidance messages, and a column 433 for storing hint messages.

A guidance message is a message for display in a selection menu for executable special actions. A guidance message is displayed when the following three conditions are satisfied.

The first condition is that the character (player character) be near a location here a special action can be executed. The second condition is that there be a plurality of types of executable special actions (hereinafter referred to as a "multitype" case). The third condition is that the trick execution condition be satisfied. The trick execution condition is that there is at least one character able to perform the special action linked with that trick in the party (including player character). The guidance message is a message showing the content (type) of a trick such as "JUMP ON", "DESTROY BY MAGIC", and "JUMP TO".

Note that the case where there is only one executable special action when the player character is near the location where a special action can be executed is referred to as a "single type". In this case, a FEEL icon is displayed.

A hint message is a message displayed when the player character is near a specific location where a special action can be executed, but there is no character able to execute that special action in the party. The hint message is a message giving the player a hint enabling execution of the special action at the location of the player character. For example, it may include "IMPOSSIBLE UNLESS SOMEONE CAN JUMP . . . " or "IF SOMEONE COULD USE MAGIC . . . ".

Next, the operation of the video game system 10 according to the present embodiment will be explained in more detail.

At startup, the CPU 12 reads the program and data required for execution of the game through the CD-ROM drive 18 from a computer readable program product, that is, the CD-ROM 30, based on the operating system stored in the ROM 13 and transfers the same to the RAM 14 and hard disk drive 15.

The CPU 12 executes the program transferred to the RAM 14 so as to perform various types of processing for progress of the game explained below.

Note that some of the control operations performed by the video game system 10 include actual control performed by devices other than the CPU 12 together with the CPU 12. Here, for convenience in explanation, the control which has something to do with the CPU 12 is deemed direct control by the CPU 12 for simplification of the explanation.

Further, the program and data required for execution of the game are successively read from the CD-ROM 30 and transferred to the RAM 14 in accordance with the state of progress of processing along with commands from the CPU 12. In the following explanation, however, to facilitate the understanding of the present embodiment, a detailed explanation of the reading of data from the CD-ROM 30 and transfer of the data to the RAM 14 is omitted.

FIG. 6 shows the overall flow of a game according to the game control method according to the present embodiment. First, the CPU 12 waits for an operational input from the keypad 50 (step S1). The operational input here includes movement of the player character and other input relating to progress of the game.

When an operational input from the keypad 50 is received, the CPU 12 performs processing for movement of the character (step S2). The player character or characters forming a party with the player character are moved in response to the operational input. Further, for example, when a party character other than the player character is displayed on the screen, the direction of movement is determined by processing by the CPU 12 and the character is moved in the determined direction. When the processing for movement of the character ends, processing is performed for movement of other movable objects (step S3). In the processing for movement of other objects, for example, processing is performed for making a bar hanging from a rope move along with the rope.

Next, the routine for special action processing with navigation is performed (step S4). Next, it is judged if the game has ended or not (step S5). For example, when the condition for ending the game has been satisfied, it is judged that the game has ended. If the game has ended, the processing is ended, while if the game has not ended, an operational input from the keypad 50 is awaited and similar processing is repeated.

Figure 8:
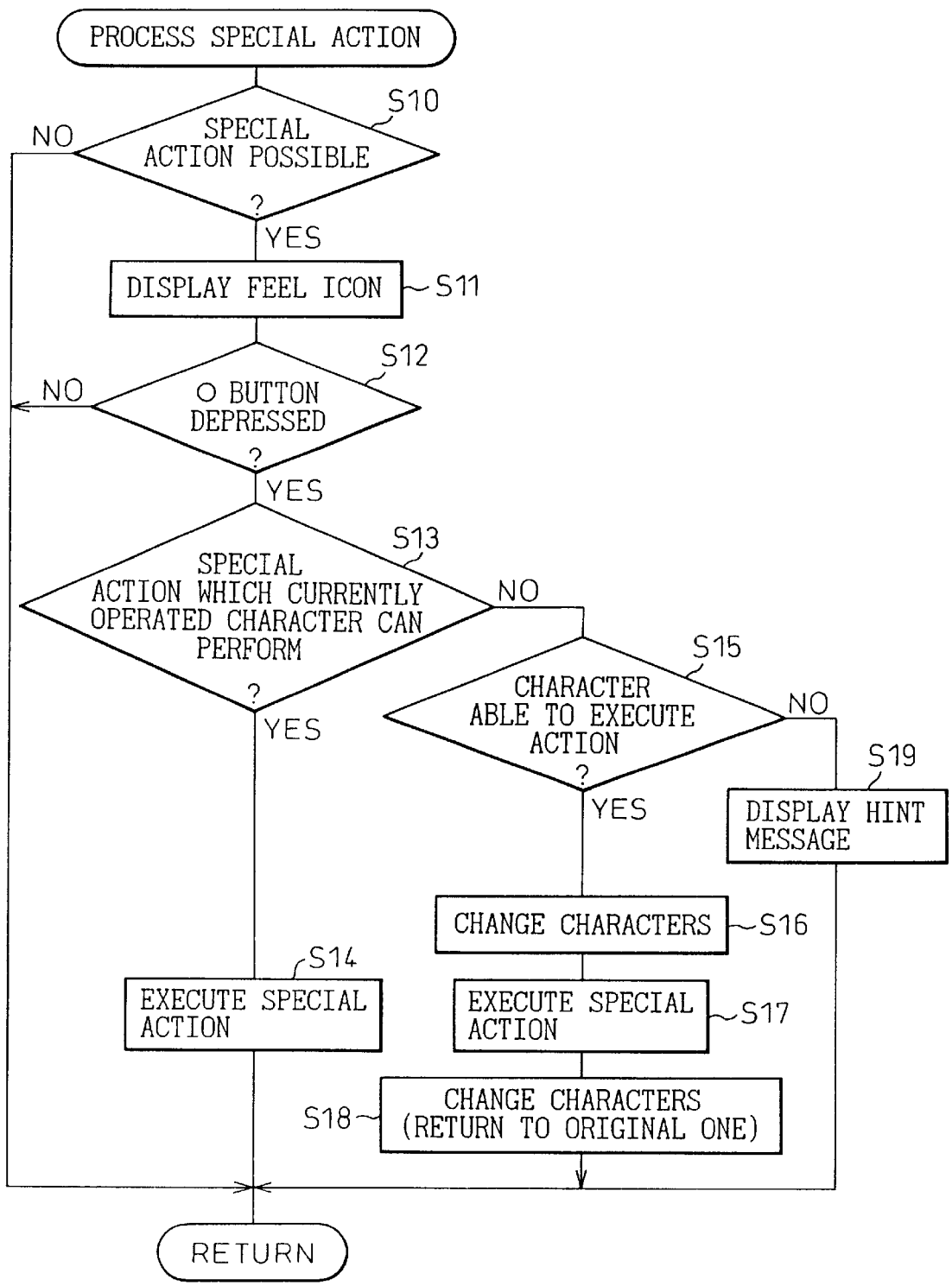
FIG. 8 is a flowchart of a special action processing routine in game by a game control method according to an embodiment of the present invention.
Figure 12C:
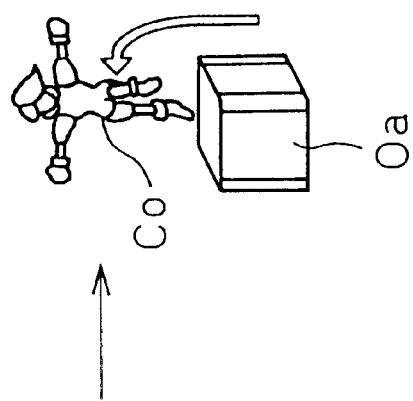
FIG. 12C is a third view of an example of the change in state of a character executing a special action.
Figure 12B:
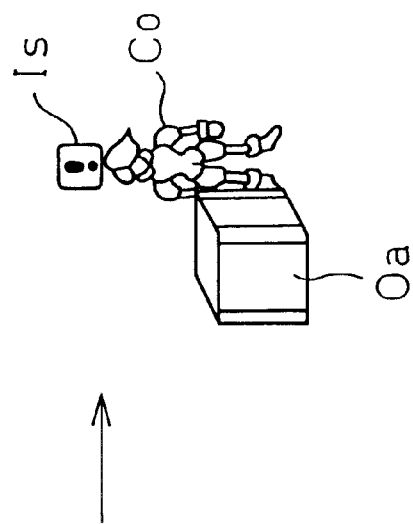
FIG. 12B is a second view of an example of the change in state of a character executing a special action.
Figure 12A:
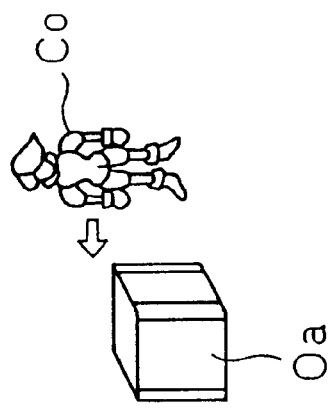
FIG. 12A is a first view of an example of the change in state of a character executing a special action.

FIG. 8 shows the routine for special action processing with navigation. This processing routine will be explained with reference to FIG. 12A, FIG. 12B, FIG. 12C, FIG. 13A, FIG. 13B, FIG. 13C, and FIG. 13D. FIG. 12A, FIG. 12B, and FIG. 12C are views of an example of the change in state of a character executing a special action. FIG. 13A, FIG. 13B, FIG. 13C, and FIG. 13D are views of an example of the change of state in the case where a character being operated cannot execute a special action.

Note that FIG. 8 shows the special action processing routine in the case where the player character is close to a specific location where a special action can be executed and there is only one special action which can be executed.

Figure 7:
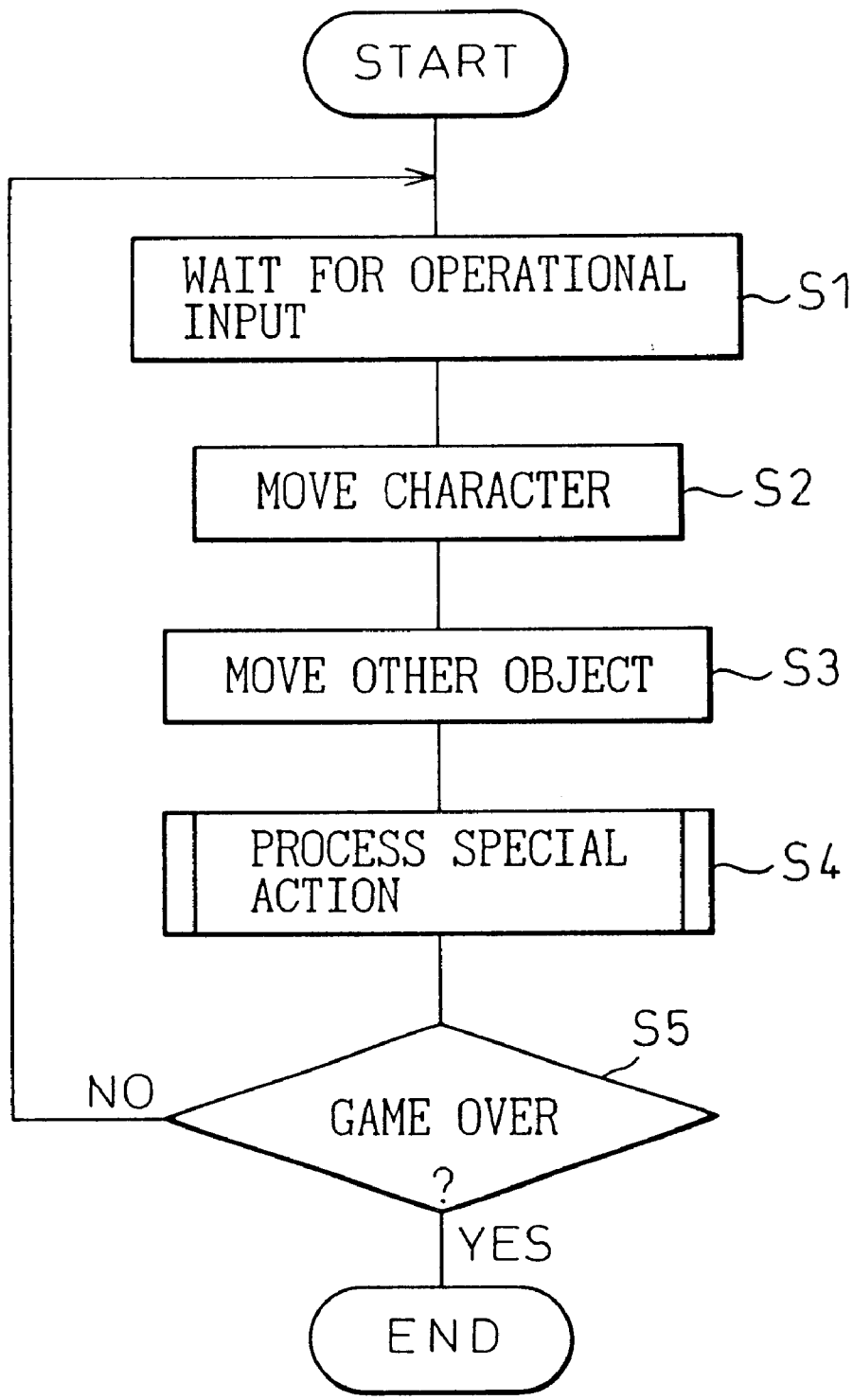
FIG. 7 is a flowchart of the overall flow of a game by a game control method according to an embodiment of the present invention.

In the special action processing, first, it is judged if the character Co being operated (player character) is close to a specific location where a special action can be executed (step S10). This judgement, as shown in FIG. 12A, is performed by whether the character Co being operated have moved to a location close to an object for which a trick is set, that is, the wood box Oa. If the special action can not be executed, the special action processing is ended and the routine proceeds to step S5 of FIG. 7.

If the character Co being operated is close to a specific location where a special action can be executed, a FEEL icon Is, in this case, an exclamation mark ("!"),is displayed above the head of the character Co being operated as a screen displaying informing the player of this (step S11). The image of the FEEL icon Is is read out from the image data storage area 14B of the RAM 14. The display of the FEEL icon Is is an embodiment of the navigation display.

Due to this, the player can easily interactively learn that a special action can be executed.

In the state with the FEEL icon Is displayed, it is judged if a predetermined button of the keypad 50, for example, the circled button, has been depressed (step S12). If another operation is performed without the predetermined button being depressed, the special action processing is ended and the routine proceeds to step S5 of FIG. 7. When the predetermined button has been depressed, it is judged if the special action can be executed by the character Co currently being operated (step S13). This judgement is performed by referring to the character ability management table 40, the trick object management table 41, and the trick execution condition management table 42.

For example, when the character Co being operated shown in FIG. 12A is the "CHARACTER A" (see FIG. 3)

and the wood box Oa is the "WOOD BOX A", the trick of the "WOOD BOX A" is "JUMP ON" and the condition for its execution is "MUST BE CHARACTER ABLE TO JUMP HIGH" (see FIG. 4). In this case, the "CHARACTER A" has the "HIGH JUMP" ability, so it is judged that the special action can be executed.

When it is judged that the "CHARACTER A" has a "HIGH JUMP" ability, as shown in FIG. 12C, the special action is executed of the character Co immediately jumping on the wood box Oa by a "HIGH JUMP" and this state is displayed on the screen (step S14). Next, the special action processing is ended and the routine proceeds to step S5 of FIG. 7.

As opposed to this, if the character Co being operated is the "CHARACTER A" and the wood box Oa is the "WOOD BOX B", the trick of the "WOOD BOX B" is "DESTROY BY MAGIC" and the condition for its execution is "MUST BE CHARACTER ABLE TO USE MAGIC" (see FIG. 4). In this case, since the "CHARACTER A" does not have that ability, it is judged NO at step S13. This being so, the special action is not executed by the character Co being operated and it is judged if there is a character having that ability in the party of the character Co being operated, in other words, a character able to execute that special action (party character) (step S15).

If there is a character Cp able to use "MAGIC" such as the "CHARACTER B" (see FIG. 3), the screen of FIG. 13A changes to the screen shown in FIG. 13B and the character Cp able to use "MAGIC" is displayed on the screen (step S16). For example, in FIG. 13A, the character Co being operated is displayed near the wood box Oa. The FEEL Icon Is is displayed above the head of the character Co. Here, if the predetermined button is depressed, as shown in FIG. 13B, the character Cp is displayed on the screen instead of the character Co.

After the character Cp is displayed on the screen, as shown in FIG. 13C, the special action is executed of the character Cp destroying the wood box Oa by "DESTROY BY MAGIC" and that state is displayed on the screen (step S17). When the special action is ended, the screen display of the character is returned to the character Co being operated (step S18). Next, the special action processing is ended and the routine proceeds to step S5 of FIG. 7.

As opposed to this, when there is no character able to execute a special action (party character), a screen is displayed for informing the player of this (step S19). In the present embodiment, a hint message showing the condition enabling execution of the special action is displayed on the screen. The hint message 121, for example, "IF SOMEONE COULD USE MAGIC . . . ", as shown in FIG. 13D, is displayed on the screen by referring to the message management table 43.

Due to this, the player can interactively learn about the requirements necessary in the progress of the game (how to deal with obstacle) and the game can progress smoothly. After the hint message is displayed, the routine proceeds to step S5 of FIG. 7.

As a special case, sometimes a plurality of objects for which tricks are set are arranged close to each other. In this case, there may be a plurality of objects covered by a special action close to the location where the plurality of objects are arranged close together. Below, processing for dealing with the case of a plurality of objects covered by a special action will be explained as an example of the application.

Figure 14:
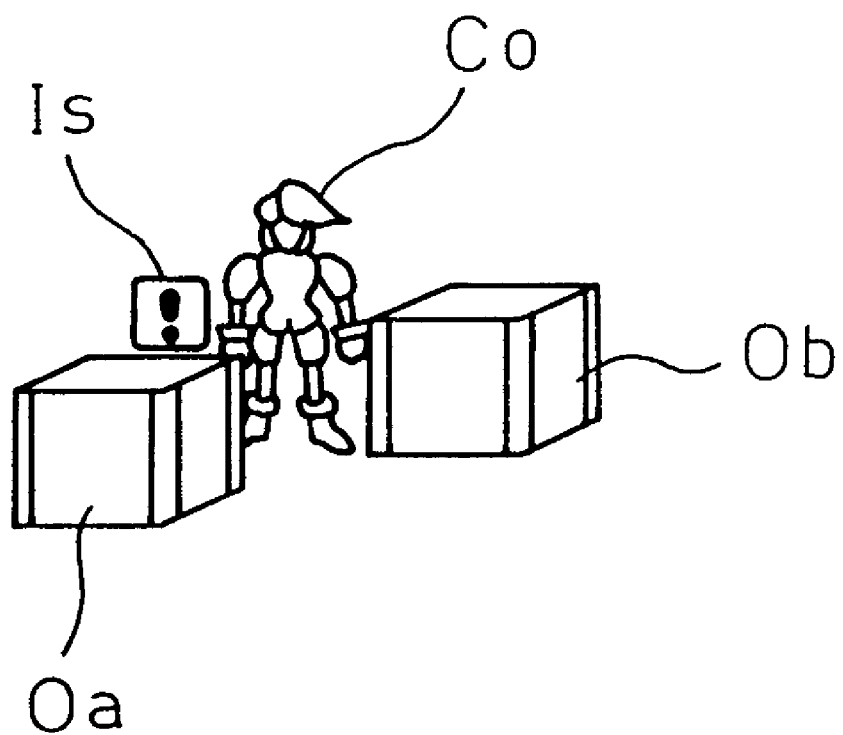
FIG. 14 is a view of an example of the state of display of a FEEL icon when a plurality of special actions are detected.

FIG. 14 is a view of an example of an embodiment of a FEEL icon in the case where a plurality of objects covered by a special action are detected. As shown in FIG. 14, the objects for which tricks are set, that is, the wood box Oa and the wood box Ob, are present close to each other. The character Co being operated can sometimes approach both of these. In this case, the FEEL icon Is is displayed not above the head of the character Co being operated, but above the wood box Oa at the side facing the front of the character Co being operated.

Figure 9:
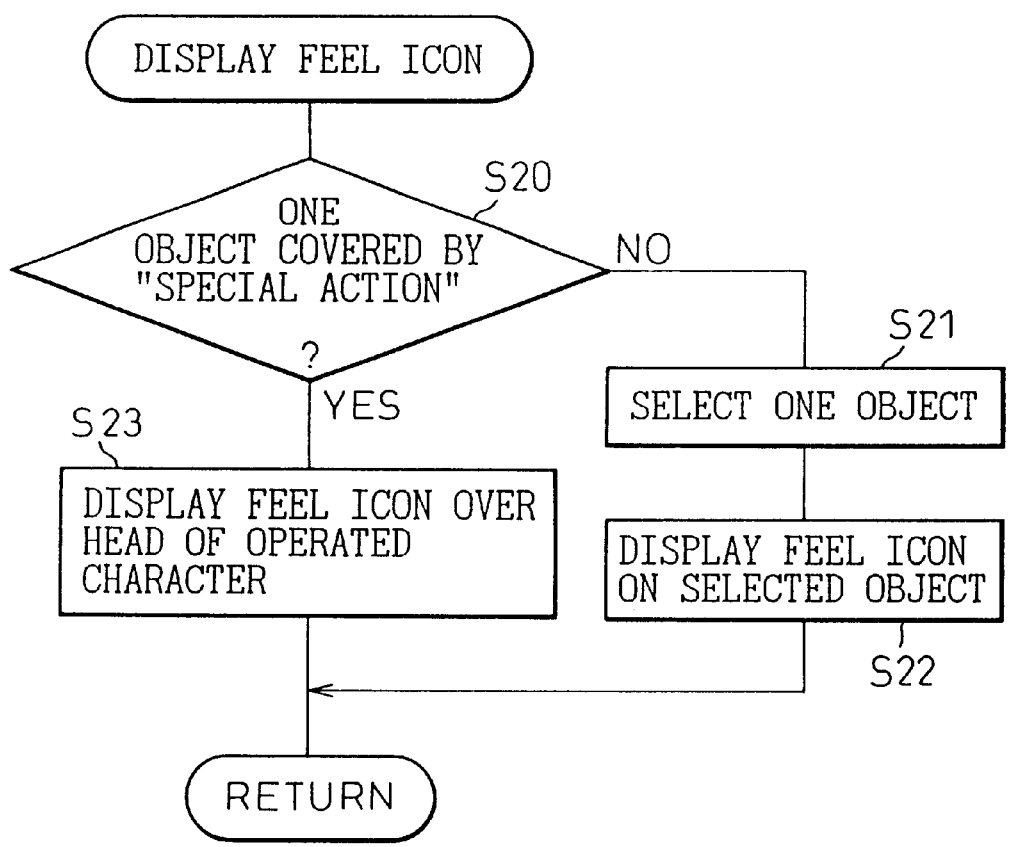
FIG. 9 is a flowchart of a FEEL icon display processing routine relating to special action processing in a game by a game control method according to an embodiment of the present invention.

FIG. 9 shows the FEEL icon display processing routine in the case where there are a plurality of objects covered by a special action. This processing is performed in place of step S11 of FIG. 8. That is, at step S10 of FIG. 8, the special action is executed when it is judged executable.

When it is judged that a special action can be executed, first, it is judged if only a single object among the plurality of objects is covered by the special action (step S20). When it is judged that the object covered by the special action is not a single object, that is, there are multiple objects covered by the special action, an object at the side facing the front of the character Co being operated is selected (step S21). Next, the FEEL icon Is is displayed above the selected object (step S22). Next, the routine proceeds to step S12 of FIG. 8.

Note that when performing a special action on an object which has not been selected, the character Co being operated is made to face another object by an operational input from the keypad 50. Due to this, the trick object covered by the special action is switched. At the same time, the position of display of the FEEL icon Is changes. That is, the FEEL icon Is is displayed above the trick object newly covered by the special action. Further, it is made possible to perform a special action on an object positioned below the FEEL icon Is.

Whether the character being operated approaches an object covered by a special action, that is, a wood box, and a special action can be executed is judged by the relative positional relationship between the object covered by the special action, that is, the wood box, and the character being operated.

For example, sometimes a special action is made executable by movement of an object covered by a special action (object for which a trick is set) to close to the character being operated. FIG. 15A, FIG. 15B, FIG. 15C, and FIG. 15D are views of an example of the change in state in the case where an object for which a trick is set moves.

If the object covered by the special action is a moving one such as the chin bar Oc shown in FIG. 15A, for example, the chin bar Oc moves from the position shown in FIG. 15A to the position shown by FIG. 15B. When reaching the timing where a special action can be executed, the exclamation point ("!") FEEL icon Is is displayed. When a predetermined key of the keypad 50, for example, the circled button, is depressed while the FEEL icon Is is displayed, as shown in FIG. 15C, the special action of the character Co being operated jumping to the chin bar Oc is executed.

On the other hand, if time elapses without the predetermined key of the keypad 50, for example, the circled button, being depressed, the chin bar Oc is moved in the lateral direction during that interval. Further, when the distance between the chin bar Oc and the character Co being operated becomes more than a certain value, the location where the character Co being operated stands no longer becomes the location where a special action can be executed. This being so, as shown in FIG. 15D, the FEEL icon Is is no longer displayed. When the FEEL icon Is is not displayed, even if the circled button of the keypad 50 is depressed, the special action of the character Co being operated jumping to the chin bar Oc is not executed.

Figure 10:
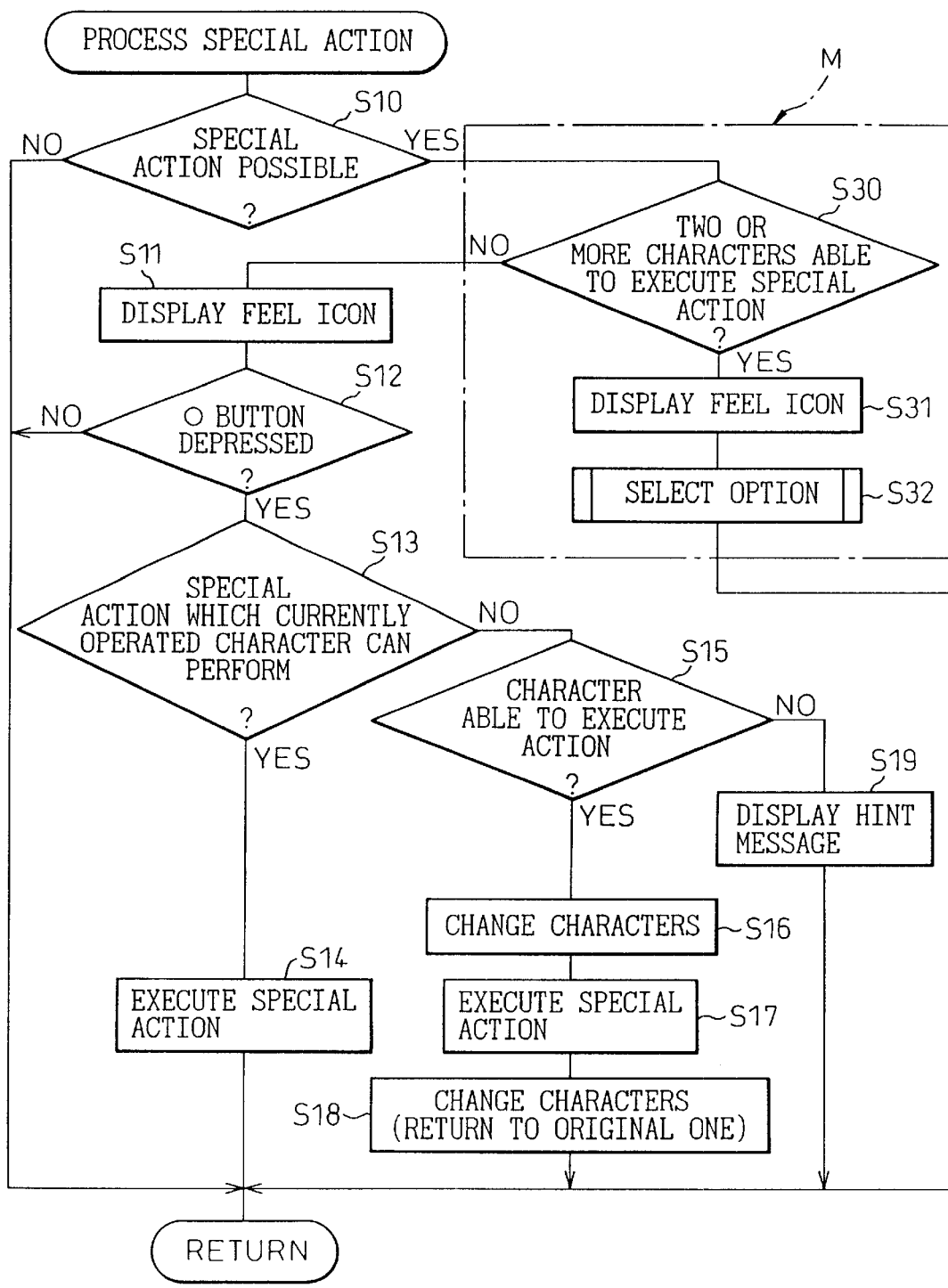
FIG. 10 is a flowchart of another example of a special action processing routine in a game by a game control method according to an embodiment of the present invention.

FIG. 10 shows a routine for special action processing with navigation in the case of a multitype. The processing routine will be explained with reference to the views explaining the screens shown in FIG. 16A, FIG. 16B, FIG. 16C, FIG. 16D, FIG. 16E, and FIG. 16F. FIG. 16A, FIG. 16B, FIG. 16C, FIG. 16D, FIG. 16E, and FIG. 16F are views of an example of the change in state in the case where a plurality of tricks are set for an object.

In the case of a multitype, the processing of the area of the code M including step S30, step S31, and step S32 is added to the routine of just the single type shown in FIG. 8. Here, a "multitype" means the case where the player character is at a location where it can execute a special action and there are two or more executable special actions. This means that multiple characters can clear an event of the event point reached.

In the case of a multitype, if a YES judgement is made at the step of judgement of whether the character being operated (player character) Co is near a specific location where a special action can be executed (step S10), it is judged if there are a plurality of types of special actions which can be executed at an object covered by the special actions, that is, whether it is a multitype case (step S30).

If not a multitype case, the routine proceeds to step S11 where the processing the same as the case of the above single type is performed. That is, first, the FEEL icon is displayed (step S11). Next, it is judged if there has been a predetermined key input (step S12). If there has been a predetermined key input, it is judged if the special action can be executed by the character being operated (step S13). If the special action can be executed by the character being operated, the special action is executed by that character (step S14). Further, if the special action cannot be executed by the character being operated, it is judged if there is a character which can execute the special action in the party (step S15). If there is no character which can execute the special action in the party, a hint message is displayed (step S19). Further, if there is a character which can execute the special action in the party, the screen display is switched to that character (step S16) and that character is made to execute the special action (step S17).

Figure 16B:
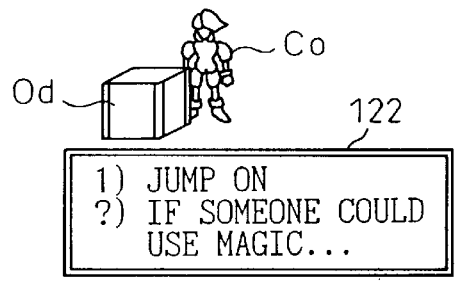
FIG. 16B is a second view of an example of the change in state when an object is set with a plurality of tricks.
Figure 16A:
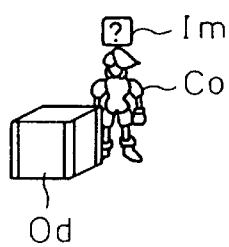
FIG. 16A is a first view of an example of the change in state when an object is set with a plurality of tricks.

As opposed to this, if a multitype case, a screen is displayed informing the player of this and, as shown in FIG. 16A, a FEEL icon Im, in this case, a question mark ("?"), is displayed above the head of the character Co close to the wood box Od (step S31). The image of the question mark ("?") is read from the image data storage area 14B of the RAM 14. Next, the option selection processing routine is executed (step S32).

Figure 11:
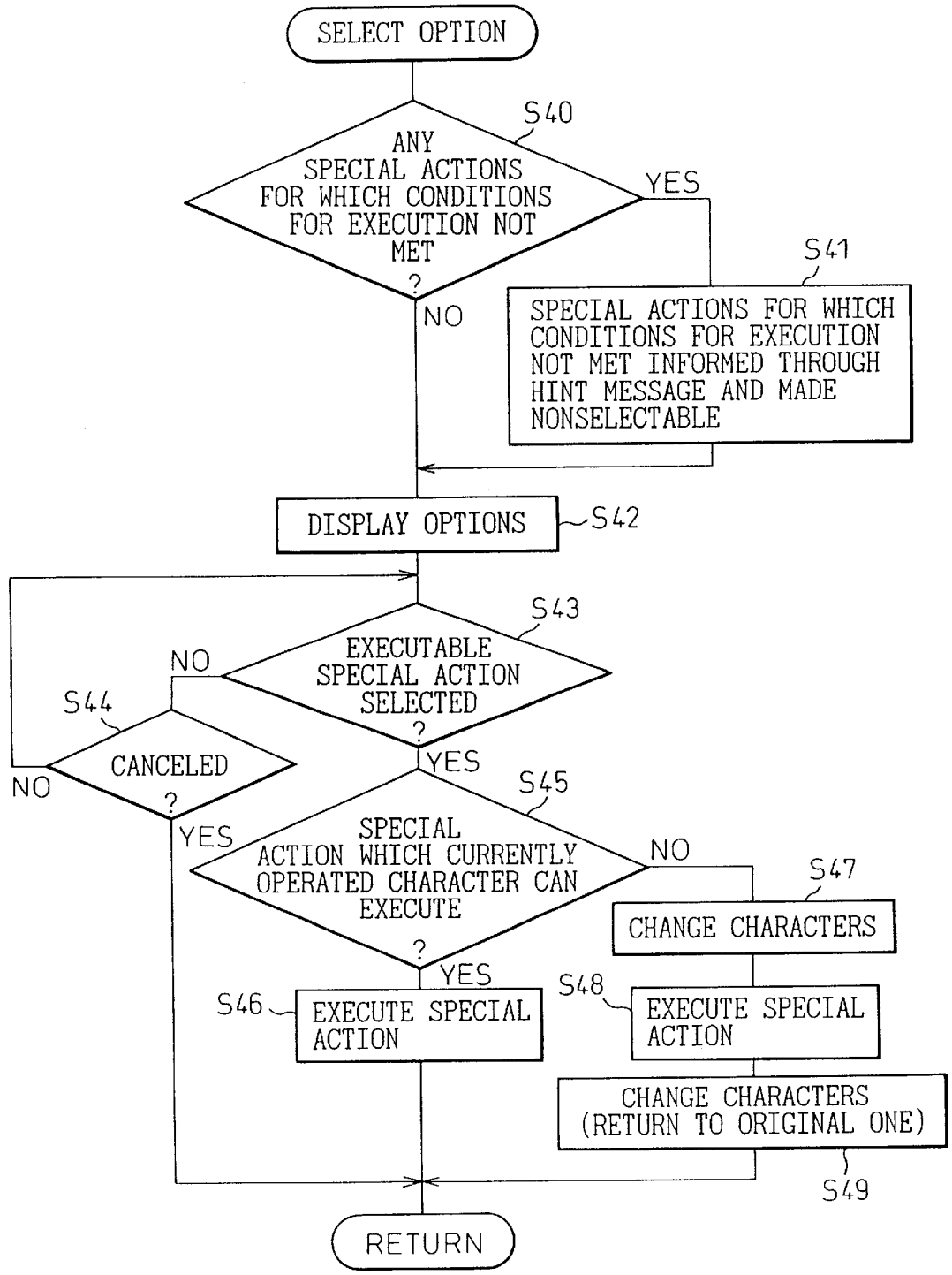
FIG. 11 is a flowchart of an option selection processing routine in a game by a game control method according to an embodiment of the present invention.

Next, the option selection processing routine will be explained. FIG. 11 is a flowchart of the option selection processing routine. First, it is judged if there is a special action for which the condition for execution has been satisfied (step S40). For example, the two special actions "JUMP ON" and "DESTROY BY MAGIC" are made possible for the wood box Od shown in FIG. 16A.

In this case, first, it is judged if the character Co being operated or any one of the party characters sharing actions with the character Co has the "JUMP ON" ability. If none of the character Co and party characters has a "JUMP ON" ability, it is judged that the condition for execution of the special action "JUMP ON" is not satisfied. If the character Co or any one of the party characters has the "JUMP ON" ability, it is judged that the condition for execution of the special action "JUMP ON" has been satisfied. Similarly, it is judged if the condition for execution of the special action is satisfied for the special action "DESTROY BY MAGIC". When the conditions for execution of all of the special actions are satisfied, the routine proceeds to step S42.

If there are one or more special actions for which the conditions for execution are not satisfied, the display messages relating to those special actions are made hint messages and selection of these actions is disabled (step S41). For example, if the "CHARACTER B" is not present as the party character Cp in a state where the special action "DESTROY BY MAGIC" is executable, the condition for execution is not satisfied for the special action "DESTROY BY MAGIC". Therefore, the display message for the special action is made a hint message and selection of that action is disabled (step S41). Next, the selection message is displayed on the screen giving as selectable items the special actions for which the conditions for execution are satisfied (step S42). For example, a selection message having the message "JUMP ON" as a selectable item is displayed on the screen for the special action "JUMP ON" for which the condition for execution is satisfied. This display of a selection message is an embodiment of the navigation display.

Due to this, the screen shown in FIG. 16B is displayed. In the example of FIG. 16B, the selection menu 122 including a hint message is displayed on the screen. The selection menu 122 displays "JUMP ON" and "IF SOMEONE COULD USE MAGIC . . . " In the selection menu 122, only "JUMP ON" can be selected. A question mark ("?") is displayed at the right side of the message "IF SOMEONE COULD USE MAGIC . . . " This question mark ("?") clearly shows that the message "IF SOMEONE COULD USE MAGIC . . . " is a hint message.

Figure 16C:
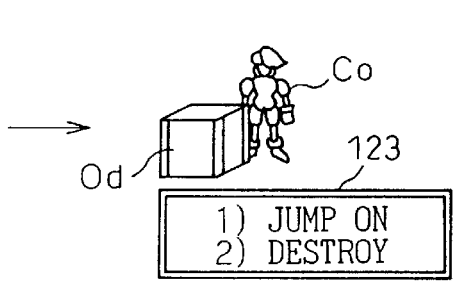
FIG. 16C is a third view of an example of the change in state when an object is set with a plurality of tricks.

If the "CHARACTER B" is present as the party character Cp (see FIG. 3), the condition for execution of both the special actions "DESTROY BY MAGIC" and "JUMP ON" is satisfied (NO determination at step S40). In this case, as shown in FIG. 16C, the selection menu 123 is displayed on the screen for both the special actions "DESTROY BY MAGIC" and "JUMP ON" as selectable items (step S42).

The operational input of the player using the keypad 50 is detected and it is judged if that operational input is an operational input for selection of one of the special actions in the selection menu (step S43). If not an operational input for selection of a special action, next, whether or not CANCEL has been input is checked (step S44). If CANCEL has been input, the routine is ended and the processing proceeds to step S5 of FIG. 7. If CANCEL has not been input, the routine proceeds to step S43. The CANCEL input is depression of a key linked with the CANCEL function on the keypad 50. If CANCEL has not been input, the routine proceeds to step S43, where it is judged again if there is an operational input for selection of a special action.

As opposed to this, when a special action is selected by an operational input (YES determination at step S43), it is judged if the selected special action is a special action which the character currently being operated can execute (step S45).

Figure 16D:
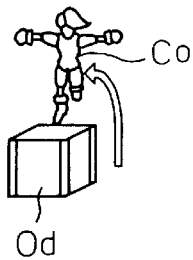
FIG. 16D is a fourth view of an example of the change in state when an object is set with a plurality of tricks.

If it is a special action which the character currently being operated can execute, for example, if the special action "JUMP ON", as shown in FIG. 16D, processing is performed so that the character Co being operated immediately jumps on to the wood box Od by a "HIGH JUMP" and this state is displayed on the screen (step S46).

Figure 16E:
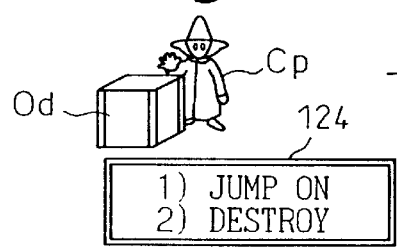
FIG. 16E is a fifth view of an example of the change in state when an object is set with a plurality of tricks.

As opposed to this, when there is no special action which the character Co currently being operated can execute, for example, when "DESTROY BY MAGIC" is selected, as shown in FIG. 16E, a character Cp able to use "MAGIC" is displayed on the screen (step S47). In the example of FIG. 16E, an icon is displayed at the right side of the message "DESTROY BY MAGIC" in the selection menu 12. In this state, "DESTROY BY MAGIC" is selected by depression of a predetermined key of the keypad 50.

Figure 16F:
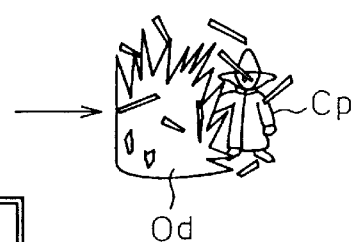
FIG. 16F is a sixth view of an example of the change in state when an object is set with a plurality of tricks.

As shown in FIG. 16F, by the execution of the special action corresponding to "DESTROY BY MAGIC" by the character Cp, a special action destroying the wood box Od is executed and that state displayed on the screen (step S48). When the special action is finished, the screen display of the character is returned to the character Co being operated (step S49). This process means when judging that characters have the ability for action assigned to the event of the event point reached, a menu is displayed for selection of any of the characters in response to the operational input of the player and the one character selected in response the displayed menu is designate the at least one character.

As explained above, icons are displayed showing that characters are able to execute special actions, a selection menu is displayed for the executable special actions, and hint messages are displayed for showing how to deal with special actions which cannot be performed. Therefore, execution of the special actions becomes easy and even a player not familiar with the game can experience the various tricks and events provided in the game.

Note that the display of icons showing that characters are able to execute special actions and other navigation functions can be also canceled by the user by initial settings at the start of the game etc.

Note that the game control method explained in the present embodiment may be realized by execution of a prepared program by a personal computer, video game system, etc. The game program according to this game control method is stored in a hard disk, floppy disk, CD-ROM, magneto-optic disk (MO), DVD, or other computer readable program product. The game program is read from the program product by a computer, and the game program executed by the program. Further, the program may be distributed through such a program product or through the Internet or other networks.

Therefore, some program products can be distributed and sold independently from the game system as software products. Further, by use of a computer or other hardware and using this software, it becomes possible to easily work the game technique of the above embodiment by this hardware.

While the invention has been described by reference to specific embodiments chosen for purposes of illustration, it should be apparent that numerous modifications could be made thereto by those skilled in the art without departing from the basic concept and scope of the invention.

For example, the navigation function of the special action explained above can be similarly applied to an adventure game, simulation game, etc. including special actions.

What is claimed is:

1. A method of executing a game program displaying a hint on a screen about a character provided with an ability for action, comprising:

presetting an event point in an area of action of the character, providing corresponding navigation information and hint information for each event point, judging if any character in a party including a plurality of characters has reached said set event point, and, when judging that the character has reached said set event point, judging if any character belonging to the party has the ability for action and selecting navigation information linked with the set event point when judging that any character in the party has the ability for action assigned to the event of the event point reached and selecting the hint information linked with the set event point when judging that no character has the ability for action assigned to the event of the event point reached, when the corresponding navigation information has been selected, performing navigation based on the navigation information on the screen, and when the corresponding hint information has been selected, providing a hint based on the hint information on the screen.

2. The method as set forth in claim 1, in which the judgement of the ability for action further comprises judging for each character if the ability for action is an ability for action assigned to the event of the event point reached.

3. The method as set forth in claim 1, further comprising, when judging that a plurality of characters have the ability for action assigned to the event of the event point reached, displaying a menu for selection of any character from the plurality of characters in response to the operational input of the player and making the one character selected in response to an operational input of the player corresponding to the displayed menu the at least one character.

4. The method as set forth in claim 1, further comprising, when said one character can move in response to an operation of the player and said one character is judged to reach a plurality of event points simultaneously, selecting one event point from the plurality of event points in response to the direction of the character on the screen as the event point for judgement of the ability for action.

5. The method as set forth in claim 1, further comprising, changing the appearance of the character, when the character does not have the ability for action, to the character that has the ability for action.

6. The method as set forth in claim 1, further comprising, displaying an icon over one trick object when there are a plurality of trick objects.

7. A computer readable program product storing a game program displaying a hint on a screen about a character provided with an ability for action, said program:

presetting an event point in an area of action of the character, providing corresponding navigation information and hint information for each event point, and making said computer:

judge if any character in a party including a plurality of characters has reached said set event point, when judging that the character has reached said set event point, judge if any character belonging to the party has the ability for action and selecting navigation information linked with the set event point when judging that any character in the party has the ability for action assigned to the event of the event point reached and select the hint information linked with the set event point when judging that no character has the ability for action assigned to the event of the event point reached, when the corresponding navigation information has been selected, perform navigation based on the navigation information on the screen, and when the corresponding hint information has been selected, provide a hint based on the hint information on the screen.

8. The program product as set forth in claim 7, said program further making the computer, in the judgement of the ability for action, judge for each character if the ability for action is an ability for action assigned to the event of the event point reached.

9. The program product as set forth in claim 7, said program further making the computer, when judging that a plurality of characters have the ability of action assigned to the event of the event point reached, display a menu for selection of any character from the plurality of characters in response to the operational input of the player and make the one character selected in response to an operational input of the player corresponding to the displayed menu the at least one character.

10. The program product as set forth in claim 7, said program further making the computer, when said one character can move in response to an operation of the player and said one character is judged to reach a plurality of event points simultaneously, select one event point from the plurality of event points in response to the direction of the character on the screen as the event point for judgement of the ability for action.

11. The program product as set forth in claim 7, said program further making the computer, change the appearance of the character, when the character does not have the ability, to the character that has the ability for action.

12. The program product as set forth in claim 7, said program further making the computer, display an icon over one trick object when there are a plurality of trick objects.

13. A game system provided with:

a unit for execution of a game in accordance with a game program displaying a hint on a screen about a character provided with an ability for action, a memory for storing all or part of the program, and a display screen for displaying the game being executed by the unit, the unit, in accordance with a program stored in the memory, presetting an event point in an area of action of the character, providing corresponding navigation information and hint information for each event point, judging if any character in a party including a plurality of characters has reached said set event point, when judging that the character has reached said set event point, judging if any character belonging to the party has the ability for action and selecting navigation information linked with the set event point when judging that any character in the party has the ability for action assigned to the event of the event point reached and selecting the hint information linked with the set event point when judging that no character has the ability for action assigned to the event of the event point reached, and when the corresponding navigation information has been selected, performing navigation based on the navigation information on the screen, while when the corresponding hint information has been selected, providing a hint based on the hint information on the screen.

14. The game system as set forth in claim 13, in which the judging further comprises judging for each character if the ability for action is an ability for action assigned to the event of the event point reached.

15. The game system as set forth in claim 13, said unit further, when judging that a plurality of characters have the ability for action assigned to the event of the event point reached, displaying a menu for selection of any character from the plurality of characters in response to the operational input of the player and making the one character selected in response to an operational input of the player corresponding to the displayed menu the at least one character.

16. The game system as set forth in claim 13, said unit further, when said one character can move in response to an operation of the player and said one character is judged to reach a plurality of event points simultaneously, selecting one event point from the plurality of event points in response to the direction of the character on the screen as the event point for judgement of the ability for action.

17. The game system as set forth in claim 13, the program further comprising:

changing the appearance of the character, when the character does not have the ability for action, to the character that has the ability for action.

18. The game system as set forth in claim 13, the program further comprising:

displaying an icon over one trick object when there are a plurality of trick objects.

* * * * *